UNITED STATES PATENT OFFICE.

JOHN CUNINGHAME MONTGOMERIE, OF DALMORE, STAIR, SCOTLAND, AND HENRY PARKES, OF LONDON, ENGLAND.

PROCESS OF EXTRACTING GOLD, SILVER, OR OTHER METALS.

SPECIFICATION forming part of Letters Patent No. 650,019, dated May 22, 1900.

Original application filed May 29, 1897, Serial No. 638,796. Divided and this application filed March 26, 1898. Serial No. 675,519. (No specimens.)

*To all whom it may concern:*

Be it known that we, JOHN CUNINGHAME MONTGOMERIE, residing at Dalmore, Stair, in the county of Ayr, Scotland, and HENRY PARKES, residing at 237 Friern road, Dulwich, London, in the county of Surrey, England, subjects of Her Majesty the Queen of Great Britain and Ireland, have invented a certain new and useful Improved Process of Extracting Gold, Silver, or other Metals, (in respect whereof we have applied for Letters Patent in Great Britain to bear date April 21, 1897, No. 9,964,) of which the following is a specification.

This invention relates to the treatment of ores or tailings of a refractory character for the purpose of separating and collecting the gold and silver contained therein, the objects of the invention being to secure expedition, a high percentage of extraction, and economy in the cost of working.

This application is a division of our original application, Serial No. 638,796, filed May 29, 1897.

In treating ores or tailings of a refractory character or ores in which the precious metals are combined with copper, zinc, lead, or other base metals according to our improved method the ore or other material having been crushed sufficiently fine to admit of its passing through a sieve of from thirty to sixty meshes to the lineal inch is calcined or roasted in a reverberatory or other suitable calcining furnace or apparatus at a low red heat till the sulfids are decomposed and the metals converted, so far as possible, into sulfates and oxids, care being taken not to drive off the sulfur, (in the form of sulfurous-acid gas or any other oxidized compound of sulfur,) as is usually done. When treating the "Broken Hill" sulfid silver ore, which is generally composed of the following substances in or about the proportions given—viz., lead, 26.77 per cent.; zinc, 13.60 per cent; copper, 1.63 per cent.; silver, .0531 per cent.; gold, .0003 per cent.; iron and alumina, 5.20 per cent.; manganese, .65 per cent.; lime, 2.25 per cent.; sulfur, 14.70 per cent.; silica, 34.95 per cent.—or ores of a similar nature, the calcination is carried to a point at which the ore ceases to gain weight. The calcined ore is then mixed with the following chemical compound, the quantity necessary being determined by experiment; but for ordinary ores (including the "Broken Hill" sulfid silver ores) about five per cent. of the weight of the ore before calcination will be sufficient—viz., first, fifty-six pounds common salt; second, thirty-six pounds protosulfate of iron; third, twenty pounds nitrate of soda. Instead of protosulfate of iron, mentioned as the second constituent of the chemical compound, the following alternatives may be used—viz., persulfate of iron, anhydrous sulfuric acid, $(SO_3,)$ bisulfate of soda or of potash, sulfate of soda or other suitable sulfate. For the nitrate of soda, mentioned as the third constituent of the chemical compound, any of the following may be substituted—viz., nitrate of potash, manganate or permanganate of potash or of soda, nitrate of baryta, pernitrate of iron, nitrate or oxid of lead, red lead (minimum) or peroxid of lead, plumbate of sodium or of potassium, peroxid of manganese, or other suitable nitrate, oxid, peroxid, or plumbate. If perchlorid of iron be used as the second constituent, the third may be omitted. The constituents of the chemical compound may be varied to some extent to suit the character of the ore under treatment, such adjustments being readily determinable by experiment. The mixture is then allowed to remain chlorinating in the calcining-furnace without being stirred for an hour to an hour and a half, a dull-red or red heat being maintained and the slightest admission of air guarded against. (As a matter of economy in working it is advantageous to run several furnace charges into a special furnace and then to damp it down, the heat generated in bulk being sufficient if the compound be mixed with the red-hot calcined ore before it is taken from the furnace.) When the mixture of calcined ore and compound has been retorted or furnaced for the requisite time, it is turned out, cooled, ground, and placed in a large suction or gravity filter and all soluble salts are washed out with water. If the ore be of a free-filtering nature, the filter may be filled with water and the ore emptied in direct from the furnace after being broken up without being cooled or ground. The soluble salts having been washed out, a ten-per-cent. (by volume) solution of sulfuric acid (specific gravity 1.84) is run on and is caused to percolate slowly through the mixture for about two hours, the solution after passing through being returned to the top of the filter. About twenty-two hundredweight of solution per ton of ore would be sufficient. It is now drawn off and another ten-per-cent. solution of about the same quantity run on and allowed to percolate repeatedly through it for about eighteen hours. It is then drawn off and the ore washed free of acid. The first acid solution drawn off is passed through another charge of ore in order to exhaust the acid before the extraction of the metals from the solution. This charge of ore is then treated with the acid solutions, as before mentioned. The foregoing operations having extracted the soluble copper and zinc as sulfates, a strong solution of hyposulfite of soda (to which a small quantity of dioxid or peroxid of soda or other suitable oxygen-yielding substance may, if desired, be added) is now run on the ore to extract the silver. The solution is allowed to percolate repeatedly till the chlorid of silver is dissolved. It is then drawn off and the ore thoroughly washed free from hyposulfite. The copper is recovered from the sulfate solution by passing it through a filter of scrap iron, and the zinc is recovered by precipitation by carbonate of soda free from hydrate, or by bicarbonate of soda, or a mixture of these, or by electrolysis. The zinc precipitate will contain iron and other impurities, which may be separated from the zinc by distillation. The silver is separated from the hyposulfite solutions in the usual way—as, for example, by means of sodium sulfid or by electrolysis.

The foregoing treatment is suitable for the "Broken Hill" sulfid silver ores or ores of a similar nature. In treating these ores with dilute acid care should be taken to use a sufficient quantity of water to prevent the mixture becoming gelatinous, and with a like object the quantity of acid should be restricted. Ores which contain arsenic and antimony are calcined at the beginning at a slightly-higher temperature in order to volatilize these metals, the addition of a little charcoal or carbonaceous matter facilitating the liberation of the metals, which may subsequently be recovered by condensation. When the ore is tolerably free from them, the heat is reduced to a low red heat, as before specified, and the calcination is continued. In ores which do not gain weight in calcination the calcination is carried to a point which converts the sulfids into sulfates with as little loss in weight of ore as possible. If too great a heat be used, the sulfates become decomposed and volatilization of the precious metals takes place.

If an ore contains a large quantity of silver and a small quantity of gold, it is expedient after calcining the ore and treating it with the chemical compound hereinbefore described and washing out the soluble salts, chiefly sulfates of copper and zinc, first to treat it with a hyposulfite, sulfite, or common salt solution with a view to the extraction of the silver and then to subject the ore to a cyanid or chlorination or bromination process for the purpose of extracting the gold. If the ore be a gold one with little silver—not sufficient to repay the extra cost of extraction by hyposulfite or equivalent sodium salt—it should be treated by a cyanid process or by a chlorination or bromination process.

Ores which contain little or no copper and zinc may after calcination be washed to remove the soluble salts and be then treated by a cyanid process without the intervention of the compound treatment; but should the cyanid fail to extract a satisfactory percentage of the gold and silver or should the consumption of the cyanid be too high for profitable working then the ore must undergo treatment by the chemical compound. The gold and silver are recovered from the cyanid, chlorid, or bromid solutions by the charcoal process, the subject of Letters Patent No. 580,948, dated April 20, 1897.

The wash-water resulting from the washing out of the soluble salts in the filter usually contains gold, copper, and zinc when these metals are present in the ore treated. The acid solutions also contain these metals. In order to separate the copper and zinc or copper or zinc from the gold, we pass these solutions through a charcoal filter or series of filters constructed in every respect like those used for a cyanid solution, as described in the specification to the hereinbefore-recited Letters Patent No. 580,948. The gold is retained in the charcoal and the copper and zinc pass through with the liquid. Should silver be present, it will also be extracted with the gold. The copper and zinc are then extracted from the solutions in the manner before described. For cyanid solutions of the precious metals containing copper or zinc or both combined we have found the same process applicable for the separation of the gold and silver, the filtration being conducted in a similar way to that described for the cyanid solutions in the above-mentioned Patent No. 580,948. All solutions containing copper and zinc passed through a charcoal filter for the extraction of the precious metals should be washed out with water. The charcoal is then regenerated for reuse in the manner described in the said Patent No. 580,948. Instead of burning the charcoal we retort it or pass superheated steam or hot air or a combination thereof through the same. The charcoal being thus freed from the compounds which rendered it inert is fit for further use in the separation of the precious metals from copper and zinc solutions containing the same.

By frequent regeneration of the charcoal in the manner above referred to a considerable quantity of the precious metals may be deposited in the charcoal before resorting to the burning of the charcoal.

Before reusing the charcoal we cool it down to the temperature of the atmosphere by passing cold air therethrough. In passing hot air or steam through the charcoal care must be taken not to apply them at such a temperature as to cause combustion of the charcoal.

We have found that by merely drying the charcoal (preferably in the sun) its precipitating qualities are restored.

For the extraction of gold or silver or gold and silver at one operation the process covered by the said Patent No. 580,948 may be adopted.

What we claim as our invention, and desire to secure by Letters Patent, is—

1. The herein-described process of extracting gold and silver and copper, zinc or other base metals from refractory ores, which consists in calcining the ore until any sulfids which may be present are converted into sulfates and oxids, subjecting the calcined ore with a compound composed of common salt, a sulfuric-acid-yielding agent as described and an oxygen-yielding substance, as specified to a red heat without the admission of air, treating the mass with water to remove the soluble salts, subjecting the residue to sulfuric acid, then washing the mass, subjecting the residue to a solution of hyposulfite of soda, and finally subjecting the residue to a gold solvent, substantially as described.

2. The herein-described process of extracting gold and silver from refractory ores, which consists in calcining the ore until any sulfids which may be present are converted into sulfates and oxids, subjecting the calcined ore with a compound composed of common salt, a sulfuric-acid-yielding agent as described, and an oxygen-yielding substance as specified to a red heat, without the admission of air, treating the mass with water to remove the soluble salts, subjecting the residue to a solution of hyposulfite of soda and finally subjecting the residue to a gold solvent, substantially as described.

JOHN CUNINGHAME MONTGOMERIE.
HENRY PARKES.

Witnesses to the signature of John Cuninghame Montgomerie:
ALEX F. REID,
JOHN BROWN.

Witnesses to the signature of Henry Parkes:
D. C. PARKES,
H. R. PARKES.